Jan. 9, 1940.  J. W. RASH  2,186,124
LAMINATED STRUCTURE AND METHOD FOR MAKING THE SAME
Filed Sept. 12, 1936
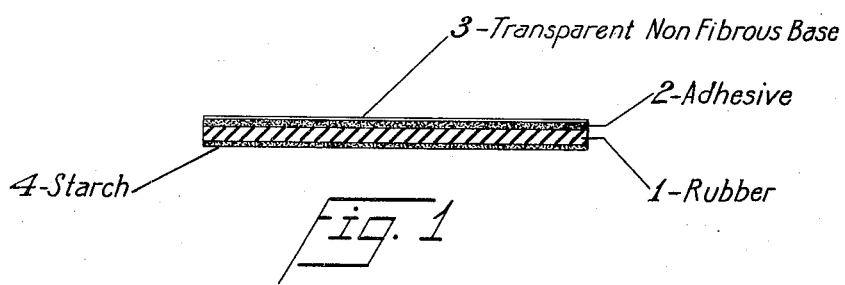
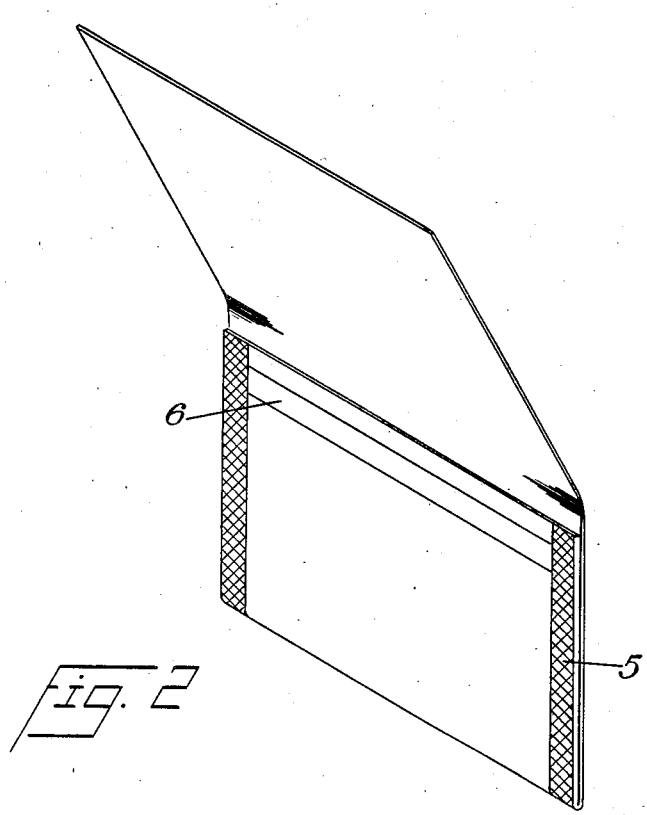
John W. Rash INVENTOR
BY Frank C Hilberg ATTORNEY Patented Jan. 9, 1940

2,186,124

UNITED STATES PATENT OFFICE 2,186,124

LAMINATED STRUCTURE AND METHOD FOR MAKING THE SAME

John Webb Rash, Newark, N. J., assignor to E. I. du Pont de Nemours & Company, Wilmington, Del., a corporation of Delaware Application September 12, 1936, Serial No. 100,419

6 Claims. (Cl. 154—40)

This invention relates to the preparation of laminated material and more particularly to the preparation of laminated material in which a flexible non-fibrous transparent film of cellulosic material is firmly united to a substantial layer of rubber composition, and the use of this material in the preparation of containers.

Heretofore, it has been common practice to unite cloth, paper, and similar fibrous materials to a layer of rubber and subsequently vulcanizing the material with the result that the two layers are inseparable. The preparation of laminated material of this type is commonly practiced and presents no serious problem since paper and cloth are porous and the raw rubber is easily forced into the interstices of the fabric so that the fibers are embedded in the rubber. Upon vulcanization, the components of the laminated material are integrally united.

With the widespread use of regenerated cellulose sheet material such as that sold under the trade-mark "Cellophane," and cast cellulose derivative films, it has been found desirable to laminate such films with rubber. However, due to the great difference in the physical and chemical properties of the two materials, no satisfactory method has heretofore been found for uniting such materials where the bond between the two has been at all substantial.

This invention has as an object the provision of a method of producing laminated material in which a dense, non-fibrous layer of cellulosic material is intimately joined to a substantial layer of uncured rubber composition as distinguished from a thin application of pure rubber cement.

Another object of this invention is the provision of laminated material in which a dense non-fibrous layer of cellulosic material is joined to a substantial layer of rubber by means of an intermediate adhesive film.

A still further object of this invention is the provision of a method of preparing a container from a laminated material having a layer of uncured rubber composition intimately joined to an ornamentally printed transparent cellulosic sheet.

These objects are accomplished by printing, applying a thin film of a suitable nitrocellulose composition to a transparent sheet and subsequently applying thereto an adhesive, and when sufficiently dry applying a layer of filled rubber composition.

In the drawing, Figure 1 represents a diagrammatic section through a portion of the laminated material; Figure 2 represents a pouch prepared from such material. In Figure 1, the rubber composition is indicated as 1, the adhesive shown as 2, and the transparent non-fibrous base is indicated as 3. A surface layer of starch is shown as 4. In Figure 2, 5 represents an area which has been permanently sealed together by applying pressure to the designated area with a knurled rotating wheel or press (not shown). A temporary seal for keeping the contents of the container in an air tight condition may be obtained by applying pressure at any convenient zone such as that represented by 6.

In carrying out the invention, a flexible film such as regenerated cellulose is printed with a cellulose derivative ink over substantially its entire area. The inked surface is then coated with a thin layer of an adhesive material which will be more fully described later. When the adhesive is dry, a substantial layer of uncured filled rubber composition is calendered onto the sheet in contact with the adhesive.

While regenerated cellulose, either plain or moisture-proof, is preferred as the transparent sheet material, other transparent films such as those prepared from rubber derivatives such as chlorinated or hydrogenated rubber, or rubber hydrochloride, may be used. Cellulose derivative films such as cellulose nitrate, cellulose acetate, or cellulose ethers such as ethyl cellulose and benzyl cellulose, may be used. It has also been found that suitable films may be prepared from cellulose derivative films cast from aqueous or alcoholic dispersions, such as glycol cellulose, cellulose glycolic acid, and lower etherified or esterified celluloses. In fact, the invention relates to the use of practically any transparent film which retains its transparency and flexibility and is resistant to abrasion for an extended period of time.

It has been found that nitrocellulose inks in general may be used for printing the surface of the regenerated cellulose or other transparent material, and are satisfactory for obtaining a good bond between the film and the subsequently applied layer of rubber. The following examples illustrate inks of this type which have been found satisfactory:

Example 1

| | Per cent |
|---|---|
| Nitrocellulose (¾ sec.) | 10.6 |
| Pigment | 6.7 |
| Tricresyl phosphate | 5.0 |
| Castor oil | 9.8 |
| Ethyl alcohol | 20.4 |
| Fusel oil | 2.7 |
| Toluene | 27.1 |
| Isopropyl acetate | 22.7 |

Example 2

| | Per cent |
|---|---|
| Nitrocellulose (¾ sec.) | 11.3 |
| Pigment | 7.9 |
| Castor oil | 2.0 |
| Dibutyl phthalate | 6.3 |
| Ethyl alcohol | 18.8 |
| Ethyl acetate | 4.4 |
| Isopropyl acetate | 18.8 |
| Fusel oil | 2.2 |
| Toluene | 28.3 |

Example 3

| | Per cent |
|---|---|
| Nitrocellulose (¾ sec.) | 9.7 |
| Pigment | 24.4 |
| Damar | 4.5 |
| Castor oil | 3.5 |
| Dibutyl phthalate | 3.5 |
| Ethyl alcohol | 10.0 |
| Ethyl acetate | 7.0 |
| Isopropyl acetate | 12.6 |
| Fusel oil | 1.6 |
| Toluene | 23.6 |

The above inks are compounded in any manner known to those skilled in the art and the resulting composition is applied to the transparent base by printing, although roller coating, spraying, or any other suitable method, may be used.

After the ink has been applied to the transparent sheet and allowed to dry, a thin film of a special adhesive is applied. These adhesives contain a hydrocarbon polymer which is obtained by polymerizing the isobutylene fraction in the cracking of gasoline. The polymerization is carried out at a temperature of about −60 to −80° C. in the presence of a catalyst. A suitable catalyst for this purpose is boron tri-fluoride. The polymerization takes place rapidly, and products of varying degrees of polymerization are formed. In the following examples it is preferred to use what is known as a high polymer. An example of such material is sold under the trade name of "Vistanex." The following formulas illustrate adhesives which have been found satisfactory using this material:

Example 4

| | Parts by weight |
|---|---|
| "Vistanex" | 3 |
| Rosin | 7 |
| Lacquer solvent | 18 |
| Carbon tetrachloride | 3 |
| Gasoline | 27 |

Example 5

| | Parts by weight |
|---|---|
| "Vistanex" | 5 |
| Rosin | 10 |
| Stearic acid | 2½ |
| Lacquer solvent | 22 |
| Carbon tetrachloride | 16 |
| Gasoline | 33 |

Example 6

| | Parts by weight |
|---|---|
| "Vistanex" | 10 |
| Rosin | 10 |
| Stearic acid | 2½ |
| Lacquer solvent | 22 |
| Carbon tetrachloride | 16 |
| Gasoline | 66 |

Example 7

| | Parts by weight |
|---|---|
| "Vistanex" | 20 |
| Rosin | 10 |
| Stearic acid | 2½ |
| Lacquer solvent | 22 |
| Carbon tetrachloride | 16 |
| Gasoline | 132 |

Example 8

| | Parts by weight |
|---|---|
| "Vistanex" | 5 |
| Rosin | 10 |
| Lacquer solvent | 22 |
| Carbon tetrachloride | 16 |
| Gasoline | 33 |

The most convenient method of preparing the above solutions is to dissolve the "Vistanex" in gasoline, dissolve the rosin in the lacquer solvent and carbon tetrachloride, then slowly add the rosin solution to the "Vistanex" solution with constant stirring. The solution may be warmed if necessary.

The proportion of solvents and solids may be varied to obtain the desired consistency. Lacquer solvent here is ethyl acetate. Other solvents may be used such as acetone, alcohol, et cetera.

In the above examples the invention has been illustrated by the use of "Vistanex". It will be apparent that other brands varying somewhat in the mode of preparation are equally suitable.

It has been found that about 30% of the "Vistanex," or equivalent based on the total weight of "Vistanex" and rosin, gives the best results. However, this percentage may be varied. Good adhesion has been obtained when using the adhesives illustrated above, whether stearic acid is present or not. After the adhesive film is applied over the printed surface of the transparent film, and is sufficiently dry, a coat of uncured rubber composition is calendered on to the sheet. The rubber composition is prepared preferably according to the method disclosed in the application of Shaw and Moriarty, Serial No. 724,724, filed May 9, 1934 now Patent No. 2,046,975. The following example illustrates a satisfactory composition:

Example 9

| | | |
|---|---|---|
| Pale crepe | Pounds | 38 |
| Whiting | do | 20 |
| Barytes | do | 42 |
| Zinc oxide | do | 5 |
| Montan wax | do | 2 |
| Rubber oil | do | 2 |
| Stearic acid | Ounces | 6 |

This compound may be modified in various ways that will be apparent to those skilled in the art as by adding coloring matter or essences, or in the use of other waxes and other types of rubber such as Balata or synthetic rubber substitutes, for example, that known as Neoprene. Satisfactory results have been obtained by applying the above composition to the extent of about 6 oz. per sq. yd.

After the laminated material leaves the calender rolls, it is subjected to a starching and brushing operation. The application of starch may be done by the use of a starching box such as those well known in the art or by any other means which will deposit a thin film of starch whether done by machinery or by hand. After the starching has been applied and the excess removed, the material is wound on to a roll in which condition it may be stored until ready for use.

The purpose of the starch is to form a non-sticky surface on the rubber side of the material. The rubber composition and the amount of starch applied are regulated so that subsequently after two pieces of the laminated material are brought together in such a way that the rubber surfaces are next to each other and pressure is applied along a narrow area the starch film will be broken and a temporary seal will be formed. This seal may be made and broken a great many times, and this property of the material makes it particularly valuable for the preparation of containers where it is essential to keep the contents in an airtight condition such as in tobacco pouches.

In describing the laminated material herein disclosed the word "substantial" is intended to mean a layer of rubber composition sufficiently thick so that when a surface layer of starch is applied it will still have enough body to form a temporary seal. We do not intend to cover a layer of rubber composition so thin that the starch layer represents enough of the film to render it non-tacky. It has been found that ordinarily the thinnest practical layer is about .003 of an inch. The rubber layer may be as thick as desired; however, at present I prefer to apply layers between .003 and .012 inch thick since if the layer is thicker than .012 inch the cost and weight of the laminated material is greatly increased. The preferred thickness is about .006.

In the preparation of tobacco containers, the material is unrolled and cut into sections of suitable size depending upon the dimensions and shape of the finished container. The material is then folded as shown in Figure 2 and sufficient pressure is applied along the edges 5 or any other area where desired to break the starch film so that the two rubber surfaces along the area at which pressure is applied are practically permanently joined. It has been found convenient to join these edges by means of a rotating knurled wheel. The pressure applied at these areas is much greater than that applied to form a temporary seal.

As indicated above, the ingredients in the rubber composition may be varied to some extent without departing from the spirit of the invention provided the property of forming a temporary seal is not destroyed. While a useful product may be obtained if the rubber is vulcanized and subsequently joined to the transparent film, the resulting material could not be temporarily sealed in the manner described above. For this reason, it is preferred to use unvulcanized rubber.

It will be noted that a considerable percentage of filler appears in the formula for the rubber composition. This keeps the finished material adhesive under a great variety of conditions of humidity and temperature whereas if little or no filler were added, the rubber would too readily tend to form a permanent seal. In the claims, by the term "filled" I mean that the rubber composition so described contains sufficient filler to prevent the composition from forming more than a temporary bond under moderate pressure so that the composition is tacky but not soft and sticky and this tackiness is overcome by a thin surface film of starch.

While my preferred method of operation involves printing or coating the transparent sheet on the side in contact with the rubber, I may apply a clear coat on this side and print a legend or design on the opposite side with any suitable ink either before or after the rubber composition is applied to the base sheet.

Materials produced according to the present invention present an appearance of striking beauty and have the further advantage that they may be prepared at comparatively low cost. In fact, the cost is low enough so that they may be used as the original containers in the retail sale of tobacco and may be discarded when the tobacco is used up and still represent a saving over tin cans.

As many widely different and varied embodiments of the invention may be had without departing from its spirit and scope, it is to be understood that the invention is not to be limited to the specific embodiments hereinbefore set out, but only as defined to the appended claims.

I claim:

1. Process of preparing a flexible laminated sheet material which comprises applying a thin film of a nitrocellulose ink to a smooth transparent base material, applying thereto a film of a composition containing polymerized isobutylene and rosin, and subsequently applying a substantial layer of filled, uncured rubber composition.

2. Process of claim 1 in which a surface layer of starch is applied to the rubber layer.

3. Process of preparing a flexible laminated sheet material which comprises printing on a transparent smooth base material with a nitrocellulose ink, applying thereto a solution of an isobutylene polymer and rosin, allowing the solvents to evaporate, and applying a substantial layer of filled, uncured rubber composition.

4. Process of claim 3 in which the hydrocarbon polymer is polymerized isobutylene and is present in amount approximately 30% of the combined weight of rosin and polymer.

5. A flexible laminated sheet material comprising a transparent base having a smooth, dense surface intimately joined to a substantial layer of filled, uncured rubber composition by means of an intermediate film containing polymerized isobutylene and rosin.

6. A flexible laminated material comprising a transparent base having a smooth, dense surface, an intermediate film comprising a nitrocellulose ink, and a composition containing polymerized isobutylene and rosin, and joined thereto a substantial layer of filled, uncured rubber composition.

JOHN WEBB RASH.